(12) United States Patent
Sommer et al.

(10) Patent No.: US 8,865,832 B2
(45) Date of Patent: Oct. 21, 2014

(54) TIN-FREE AQUEOUS POLYURETHANE DISPERSIONS

(75) Inventors: Stefan Sommer, Leverkusen (DE); Erhard Luehmann, Bomlitz (DE); Thorsten Rische, Columbus, IN (US); Jürgen Lippemeier, Köln (DE)

(73) Assignee: Bayer MaterialScience AG, Leverkusen (DE)

( * ) Notice: Subject to any disclaimer, the term of this patent is extended or adjusted under 35 U.S.C. 154(b) by 578 days.

(21) Appl. No.: 12/915,304

(22) Filed: Oct. 29, 2010

(65) Prior Publication Data
US 2012/0041131 A1 Feb. 16, 2012

(30) Foreign Application Priority Data
Oct. 31, 2009 (DE) .................. 10 2009 051 557

(51) Int. Cl.
| C09J 175/16 | (2006.01) |
| C08G 18/32 | (2006.01) |
| C08G 18/66 | (2006.01) |
| C08G 18/08 | (2006.01) |
| C08G 18/68 | (2006.01) |
| C08G 18/12 | (2006.01) |
| C08G 18/67 | (2006.01) |
| C08G 18/72 | (2006.01) |
| C08G 18/75 | (2006.01) |
| C08G 18/79 | (2006.01) |
| C08G 18/22 | (2006.01) |

(52) U.S. Cl.
CPC ........... *C09J 175/16* (2013.01); *C08G 18/3228* (2013.01); *C08G 2170/80* (2013.01); *C08G 18/6659* (2013.01); *C08G 18/0823* (2013.01); *C08G 18/68* (2013.01); *C08G 18/12* (2013.01); *C08G 18/672* (2013.01); *C08G 18/722* (2013.01); *C08G 18/758* (2013.01); *C08G 18/792* (2013.01); *C08G 18/227* (2013.01)
USPC ......................................... 524/839; 526/192

(58) Field of Classification Search
USPC ......................................... 524/839; 526/192
See application file for complete search history.

(56) References Cited

U.S. PATENT DOCUMENTS

| 5,684,081 | A | 11/1997 | Dannhorn et al. |
| 6,100,326 | A | 8/2000 | Richter et al. |
| 2007/0218391 | A1 | 9/2007 | Yamada et al. |
| 2008/0194775 | A1 | 8/2008 | Blum et al. |
| 2008/0220275 | A1 | 9/2008 | Noguchi et al. |

FOREIGN PATENT DOCUMENTS

| CA | 2253119 A1 | 5/1999 |
| DE | 2446440 A1 | 4/1976 |
| DE | 3316592 A1 | 11/1984 |
| DE | 4040290 A1 | 7/1992 |
| DE | 102007006492 A1 | 8/2008 |
| DE | 102008000478 A1 | 9/2008 |
| EP | 0753531 A1 | 1/1997 |
| EP | 0916647 A2 | 5/1999 |
| EP | 0928799 A1 | 7/1999 |
| GB | 1462597 A | 1/1977 |
| WO | WO-20080762970 A1 | 6/2008 |
| WO | WO-2008/148739 A1 | 12/2008 |

*Primary Examiner* — Peter D Mulcahy
(74) *Attorney, Agent, or Firm* — Drinker Biddle & Reath LLP

(57) ABSTRACT

The present invention relates to radiation-curable coating compositions based on tin-free aqueous polyurethane dispersions based on polyurethane acrylates (i), characterized in that the polyurethane acrylate (i) comprises as builder components
A) one or more compounds with at least one group which is reactive towards isocyanate and at least one unsaturated group which can undergo free radical polymerization,
B) one or more compounds which differ from A) and have at least one group which is reactive towards isocyanate,
C) one or more compounds with at least one group which is reactive towards isocyanate and additionally at least one group having a hydrophilizing action,
D) one or more organic polyisocyanates,
which are reacted in the presence of
F) bismuth(III) salt(s) and
G) an acid having a pKa of <2.5,
and a process for the preparation thereof, the use of the coating compositions as lacquers and/or adhesives, and objects and substrates provided with these lacquers and/or adhesives.

18 Claims, No Drawings

TIN-FREE AQUEOUS POLYURETHANE DISPERSIONS

RELATED APPLICATIONS

This application claims benefit to German Patent Application No. 10 2009 051 557.7, filed Oct. 31, 2009, which is incorporated herein by reference in its entirety for all useful purposes.

BACKGROUND OF THE INVENTION

The present invention relates to radiation-curable coating compositions based on tin-free aqueous polyurethane dispersions, a process for the preparation thereof, the use of the coating compositions as lacquers and/or adhesives, and objects and substrates provided with these lacquers and/or adhesives.

Aqueous radiation-curable polyurethane dispersions have hitherto been synthesized via tin-catalysed urethanization. The main reason for the catalysis is that during synthesis of the polyurethane temperatures of 70° C. should not be substantially exceeded, in order to avoid thermally initiated polymerization of the unsaturated groups which can undergo free radical polymerization. At such low temperatures, aliphatic isocyanates such as are preferably used in aqueous radiation-curable polyurethane dispersions react only very slowly. Dibutyltin dilaurate (DBTL) is by far the preferred catalyst for synthesis of aqueous radiation-curable polyurethane dispersions because of the high selectivity for the OH-NCO addition and the high catalytic activity.

For the catalysis of the urethanization, various other metal and non-metal catalysts, such as e.g. tertiary amines, compounds of tin, zinc, zirconium, copper, bismuth, titanium and molybdenum, are known from lacquer application of one-component (1C) and two-component (2C) polyurethane dispersions, i.e. the reaction of hydroxy-functionalized polyurethane dispersions with blocked and non-blocked polyisocyanates by stoving on the substrate. These catalysts are optimized for the preparation of 1C or 2C lacquers, i.e. they are said e.g. to have similar pot lives and temperature activity profiles to DBTL or to prefer the isocyanate-alcohol reaction over the isocyanate-water reaction. For the synthesis of the polyurethane of an aqueous radiation-curable polyurethane dispersion, they are unsuitable and significantly inferior to DBTL because of side reactions (e.g. allophanation), a low catalytic activity under the reaction conditions typical of the synthesis of aqueous radiation-curable polyurethane dispersions, or because of the property that too low molecular weights are achieved.

Aqueous radiation-curable polyurethane dispersions which are prepared with unsuitable catalysts show a coarser particle pattern, sediment immediately or are significantly more highly viscous than aqueous radiation-curable polyurethane dispersions of the same composition which are catalysed with DBTL.

Q. Bell, Raw Materials and their Usage, in: Solvent-Borne Urethane Resins, vol. 1: Surface Coatings, Chapman and Hall, New York, 1993, p. 153 et seq. describes various aminic and metal-based catalysts which catalyse the OH-NCO addition in 2C uses. The suitability of these catalysts for synthesis of the polyurethane from aqueous radiation-curable polyurethane dispersions is not described.

WO 2008148739 A1 describes various catalysts which are suitable in principle for the preparation of the polyurethane of an aqueous radiation-curable polyurethane dispersion. DBTL is clearly preferred, and also used in the examples.

DE 102007006492 A1 and EP 753531 A1 describe various catalysts which are suitable in principle for the preparation of the polyurethane of an aqueous radiation-curable polyurethane dispersion. DBTL is clearly preferred, and also used in the examples.

There was a general need to change radiation-curable aqueous polyurethane dispersions for the preparation of wood lacquers over to novel lacquers which contain no organotin compounds. A representative example of such a requirement are the specifications required for coatings by IKEA in IOS-MAT-066, 2006, p. 4.

There was the object of providing alternative tin-free polyurethanes for aqueous radiation-curable polyurethane dispersions to the existing DBTL-catalysed polyurethanes for aqueous radiation-curable polyurethane dispersions. In this context, the properties of the aqueous radiation-curable polyurethane dispersions should not deviate from those of aqueous radiation-curable polyurethane dispersions synthesized via DBTL catalysis.

It has been found, surprisingly, that bismuth salts in the presence of acids having a pKa of <2.5 are outstandingly suitable for synthesizing polyurethane acrylates for aqueous radiation-curable polyurethane dispersions. The polyurethane acrylates for aqueous radiation-curable polyurethane dispersions which are catalysed in this manner correspond in physical and use properties to the DBTL-catalysed polyurethane acrylates for aqueous radiation-curable polyurethane dispersions. It is furthermore the object of a preferred embodiment of this invention to establish the weight-average molecular weight $M_W$ of the polyurethane acrylate in a range of from $10^3$ to $10^6$ g/mol. In this context, weight-average molecular weights $M_W$ of polyurethane acrylates such as are achieved for DBTL-catalysed systems can be achieved.

EMBODIMENTS OF THE INVENTION

An embodiment of the present invention is a tin-free, radiation-curable aqueous dispersion based on one or more polyurethane acrylates (i), wherein said one or more polyurethane acrylates (i) is prepared by reacting A) one or more compounds comprising at least one group which is reactive towards isocyanate and at least one unsaturated group which can undergo free radical polymerization;

B) one or more compounds which differ from A) and comprise at least one group which is reactive towards isocyanate;

C) one or more compounds comprising at least one group which is reactive towards isocyanate and at least one group having a hydrophilizing action; and D) one or more organic polyisocyanates;

in the presence of

F) one or more bismuth(III) salts; and

G) an acid having a pKa of less than 2.5.

Another embodiment of the present invention is the above tin-free, radiation-curable aqueous dispersion, wherein said one or more polyurethane acrylates (i) is prepared from additional component E) by reacting A), B), C), D), and E) in the presence of F) and G), wherein E) differs from A), B), C), and D) and comprises at least one group which is reactive towards isocyanate.

Another embodiment of the present invention is the above tin-free, radiation-curable aqueous dispersion, wherein said tin-free, radiation-curable aqueous dispersion further comprises a reactive diluent with at least one group which can undergo free radical polymerization as component (ii).

Another embodiment of the present invention is the above tin-free, radiation-curable aqueous dispersion, wherein component F) comprises one or more bismuth(III) carboxylates.

Another embodiment of the present invention is the above tin-free, radiation-curable aqueous dispersion, wherein component F) is selected from the group consisting of bismuth (III) neodecanoate, bismuth(III) 2-ethylhexanoate, bismuth (III) citrate, and mixtures thereof.

Another embodiment of the present invention is the above tin-free, radiation-curable aqueous dispersion, wherein component G) is selected from the group consisting of phosphoric acid di-(n-butyl) ester, methanesulfonic acid, p-toluenesulfonic acid, and mixtures thereof Another embodiment of the present invention is the above tin-free, radiation-curable aqueous dispersion, wherein component F) is present in said tin-free, radiation-curable aqueous dispersion in an amount in the range of from 1 to 30,000 ppm, based on the solids content of the aqueous radiation-curable polyurethane dispersion (i), and component G) is present in said tin-free, radiation-curable aqueous dispersion in an amount in the range of from 10 to 300 mol %, based on the amount of component F) used.

Another embodiment of the present invention is the above tin-free, radiation-curable aqueous dispersion, wherein component G) is present in said tin-free, radiation-curable aqueous dispersion in an amount of 100 mol % based on the amount of component F) used.

Another embodiment of the present invention is the above tin-free, radiation-curable aqueous dispersion, wherein said one or more polyurethane acrylates (i) have a weight-average molecular weight $M_W$ in the range of from $10^3$ to $10^6$ g/mol.

Another embodiment of the present invention is the above tin-free, radiation-curable aqueous dispersion, wherein component A) is selected from the group consisting of hydroxy-functionalized polyester(meth)acrylates, polyether(meth) acrylates, polyether ester(meth)acrylates, epoxy(meth) acrylates, 2-hydroxyethyl(meth)acrylate, 2-hydroxypropyl (meth)acrylate, pentaerythritol triacrylate, dipentaerythritol pentaacrylate, and mixtures thereof.

Another embodiment of the present invention is the above tin-free, radiation-curable aqueous dispersion, wherein the molar ratio of the isocyanate groups of component D) to the isocyanate-reactive groups of components A), B) and C) is in the range of from 0.8:1 to 2.5:1.

Yet another embodiment of the present invention is a process for preparing the above tin-free, radiation-curable aqueous dispersion, comprising
(1) reacting components A), B), C), and D) in the presence of components F) and G) in one or more reaction steps to obtain a polyurethane acrylate (i, wherein a neutralizing agent is added before, during, or after the reaction of components A) B), C), and D) to produce the ionic groups necessary for dispersing the polyurethane acrylate obtained; and
(2) forming a dispersion by adding water to the polyurethane acrylate or transferring the polyurethane acrylate into an aqueous reservoir.

Yet another embodiment of the present invention is a coating composition prepared from the above tin-free, radiation-curable aqueous dispersion.

Another embodiment of the present invention is the above coating composition, wherein said coating is a lacquer or an adhesive.

Another embodiment of the present invention is the above coating composition, wherein said coating composition further comprises a crosslinking agent based on an amino resin, a blocked polyisocyanate, a non-blocked polyisocyanate, a hydrophilized polyisocyanate, a polyaziridine a polycarbodiimide, one or more further dispersions, or combinations thereof.

Yet another embodiment of the present invention is a substrate coated with the above coating composition.

DESCRIPTION OF THE INVENTION

The invention relates to radiation-curable aqueous dispersions based on polyurethane acrylates (i), which are characterized in that the polyurethane acrylate (i) comprises as builder components
A) one or more compounds with at least one group which is reactive towards isocyanate and at least one unsaturated group which can undergo free radical polymerization,
B) one or more compounds which differ from A) and have at least one group which is reactive towards isocyanate,
C) one or more compounds with at least one group which is reactive towards isocyanate and additionally at least one group having a hydrophilizing action,
D) one or more organic polyisocyanates,
E) optionally compounds which differ from A) to D) and have at least one group which is reactive towards isocyanate, which are reacted in the presence of
F) bismuth(III) salt(s) and
G) an acid having a pKa of <2.5, preferably <2.0 as the catalyst.

The dispersion optionally contains a component (ii), which comprises reactive diluents containing at least one group which can undergo free radical polymerization.

In the context of this invention, "(meth)acrylate" relates to corresponding acrylate or methacrylate functions or to a mixture of the two.

In this context, the builder component A) and optionally component (ii) are employed in amounts such that the content of copolymerizable double bonds is between 0.5 and 6.0, preferably between 1.0 and 5.5, particularly preferably between 1.5 and 5.0 mol/kg of non-aqueous constituents of the dispersion.

Component (ii) is employed to the extent of 0 to 65, preferably 0 to 40, particularly preferably 0 to 35 wt. %, the wt. % of components (i) and (ii) adding up to 100 wt. %.

Component A) comprises one or more compounds with at least one group which is reactive towards isocyanate and at least one unsaturated group which can undergo free radical polymerization. Such compounds are, for example, oligomers and polymers containing unsaturated groups, such as polyester(meth)acrylates, polyether(meth)acrylates, polyether-ester(meth)acrylates, unsaturated polyesters with allyl ether structural units, polyepoxy(meth)acrylates and monomers containing unsaturated groups with a molecular weight of <700 g/mol and combinations of the compounds mentioned.

Of the polyester(meth)acrylates, the polyester(meth)acrylates which contain hydroxyl groups and have an OH number in the range of from 15 to 300 mg of KOH/g of substance, preferably of from 60 to 200 mg of KOH/g of substance, are employed as component A). In total 7 groups of monomer constituents can be used as component A) in the preparation of the hydroxy-functional polyester(meth)acrylates.

The first group (a) contains alkanediols or diols or mixtures of these. The alkanediols have a molecular weight in the range of from 62 to 286 g/mol. The alkanediols are preferably chosen from the group of ethanediol, 1,2- and 1,3-propanediol, 1,2-, 1,3- and 1,4-butanediol, 1,5-pentanediol, 1,6-hexanediol, neopentyl glycol, cyclohexane-1,4-dimethanol, 1,2- and 1,4-cyclohexanediol, 2-ethyl-2-butylpropanediol, diols containing ether oxygen, such as diethylene glycol, triethylene glycol, tetraethylene glycol, dipropylene glycol, tripropylene glycol, polyethylene, polypropylene or polybutylene glycols having number-average molecular weights Mn in the range of from 200 to 4,000, preferably 300 to 2,000, particularly preferably 450 to 1,200 g/mol. Reaction products of the abovementioned diols with ε-caprolactone or other lactones can likewise be employed as diols.

The second group (b) contains trifunctional and more than trifunctional alcohols having a molecular weight in the range of from 92 to 254 g/mol and/or polyethers started on these alcohols. Particularly preferred trifunctional and more than trifunctional alcohols are glycerol, trimethylolpropane, pentaerythritol, dipentaerythritol and sorbitol. A particularly preferred polyether is the reaction product of 1 mol of trimethylolpropane with 4 mol of ethylene oxide.

The third group (c) contains monoalcohols. Particularly preferred monoalcohols are chosen from the group of ethanol, 1- and 2-propanol, 1- and 2-butanol, 1-hexanol, 2-ethylhexanol, cyclohexanol and benzyl alcohol.

The fourth group (d) contains dicarboxylic acids having a molecular weight in the range of from 104 to 600 g/mol and/or anhydrides thereof. Preferred dicarboxylic acids and anhydrides thereof are chosen from the group of phthalic acid, phthalic anhydride, isophthalic acid, tetrahydrophthalic acid, tetrahydrophthalic anhydride, hexahydrophthalic acid, hexahydrophthalic anhydride, cyclohexanedicarboxylic acid, maleic anhydride, fumaric acid, malonic acid, succinic acid, succinic anhydride, glutaric acid, adipic acid, pimelic acid, suberic acid, sebacic acid, dodecandioic acid, hydrogenated dimers of fatty acids such as are listed under the sixth group (f).

The fifth group (e) contains trimellitic acid or trimellitic anhydride.

The sixth group (f) contains monocarboxylic acids, such as e.g. benzoic acid, cyclohexanecarboxylic acid, 2-ethylhexanoic acid, caproic acid, caprylic acid, capric acid, lauric acid, and natural and synthetic fatty acids, such as e.g. myristic, palmitic, margaric, steric, behenic, cerotic, palmitoleic, oleic, icosenic, linoleic, linolenic and arachidonic acid.

The seventh group (g) contains acrylic acid, methacrylic acid and/or dimeric acrylic acid.

Polyester(meth)acrylates containing hydroxyl groups which are suitable as component A) contain the reaction product of at least one constituent of group (a) or (b) with at least one constituent from group (d) or (e) and at least one constituent from group (g).

Particularly preferred constituents from group (a) are chosen from the group of ethanediol, 1,2- and 1,3-propanediol, 1,4-butanediol, 1,6-hexanediol, neopentyl glycol, cyclohexane-1,4-dimethanol, 1,2- and 1,4-cyclohexanediol, 2-ethyl-2-butylpropanediol, diols containing ether oxygen, chosen from the group of diethylene glycol, triethylene glycol, tetraethylene glycol, dipropylene glycol, and tripropylene glycol. Preferred constituents from group (b) are chosen from the group of glycerol, trimethylolpropane, pentaerythritol or the reaction product of 1 mol of trimethylolpropane with 4 mol of ethylene oxide. Particularly preferred constituents from groups (d) and (e) are chosen from the group of phthalic anhydride, isophthalic acid, tetrahydrophthalic anhydride, hexahydrophthalic acid, hexahydrophthalic anhydride, maleic anhydride, fumaric acid, succinic anhydride, glutaric acid, adipic acid, dodecandioic acid, hydrogenated dimers of fatty acids such as are listed under the 6th group (f) and trimellitic anhydride. The preferred constituent from group (g) is acrylic acid.

Groups having a dispersing action which are generally known from the prior art can optionally also be incorporated into these polyester(meth)acrylates. Thus, polyethylene glycols and/or methoxypolyethylene glycols can be used as a proportion of the alcohol component. Polyethylene glycols and polypropylene glycols started on alcohols and block copolymers thereof and the monomethyl ethers of these polyglycols can be used as compounds. Polyethylene glycol monomethyl ether having a number-average molecular weight Mn in the range of from 500 to 1,500 g/mol is particularly suitable.

It is furthermore possible, after the esterification, to react some of the still free, non-esterified carboxyl groups, in particular those of (meth)acrylic acid, with mono-, di- or polyepoxides. Preferred epoxides are the glycidyl ethers of monomeric, oligomeric or polymeric bisphenol A, bisphenol F, hexanediol and/or butanediol or ethoxylated and/or propoxylated derivatives thereof. This reaction can be used, in particular, for increasing the OH number of the polyester(meth)acrylate, since in each case an OH group is formed in the epoxide-acid reaction. The acid number of the resulting product is between 0 and 20 mg of KOH/g, preferably between 0 and 10 mg of KOH/g and particularly preferably between 0 and 5 mg of KOH/g of substance. The reaction is preferably catalysed by catalysts, such as triphenylphosphine, thiodiglycol, ammonium and/or phosphonium halides and/or compounds of zirconium or tin, such as tin(II) ethylhexanoate.

The preparation of polyester(meth)acrylates is described on page 3, line 25 to page 6, line 24 of DE-A 4 040 290, on page 5, line 14 to page 11, line 30 of DE-A 3 316 592 and page 123 to 135 of P. K. T. Oldring (ed.) in Chemistry & Technology of UV & EB Formulations For Coatings, Inks & Paints, vol. 2, 1991, SITA Technology, London.

Polyether(meth)acrylates which contain hydroxyl groups and originate from the reaction of acrylic acid and/or methacrylic acid with polyethers are likewise suitable as component A), thus e.g. homo-, co- or block copolymers of ethylene oxide, propylene oxide and/or tetrahydrofuran on any desired hydroxy- and/or amine-functional starter molecules, such as e.g. trimethylolpropane, ethylene glycol, propylene glycol, diethylene glycol, dipropylene glycol, glycerol, pentaerythritol neopentyl glycol, butanediol and hexanediol.

The epoxy(meth)acrylates, which are known per se, which contain hydroxyl groups and have an OH number in the range of from 20 to 300 mg of KOH/g, preferably from 100 to 280 mg of KOH/g, particularly preferably from 150 to 250 mg of KOH/g or polyurethane(meth)acrylates which contain hydroxyl groups and have an OH number in the range of from 20 to 300 mg of KOH/g, preferably from 40 to 150 mg of KOH/g, particularly preferably from 50 to 140 mg of KOH/g, are likewise suitable as component A). Such compounds are likewise described on page 37 to 56 in P. K. T. Oldring (ed.), Chemistry & Technology of UV & EB Formulations For Coatings, Inks & Paints, vol. 2, 1991, SITA Technology, London. Epoxy(meth)acrylates containing hydroxyl groups are based in particular on reaction products of acrylic acid and/or methacrylic acid with epoxides (glycidyl compounds) of monomeric, oligomeric or polymeric bisphenol A, bisphenol F, hexanediol and/or butanediol or ethoxylated and/or propoxylated derivatives thereof. Epoxy(meth)acrylates containing hydroxyl groups likewise include the addition products of acrylic acid and/or methacrylic acid with epoxides of unsaturated fats (fatty acid triglycerides), such as e.g. Photomer® 3005 F (Cognis, Düsseldorf, DE).

Oligomers and polymers which contain unsaturated groups and are preferred as component A) are compounds chosen from the group of polyester(meth)acrylates, polyether (meth)acrylates, polyether-ester(meth)acrylates and polyepoxy(meth)acrylates, which also contain hydroxyl groups in addition to the unsaturated groups.

The monomers which contain unsaturated groups and have a molecular weight of <700 g/mol are, for example, 2-hydroxyethyl(meth)acrylate, caprolactone-lengthened modifications of 2-hydroxyethyl(meth)acrylate, such as Pemcure® 12A (Cognis, DE), 2-hydroxypropyl(meth)acrylate, 4-hydroxybutyl(meth)acrylate, 3-hydroxy-2,2-dimethylpropyl (meth)acrylate, the di-, tri- or penta(meth)acrylates, which are on average monohydroxy-functional, or polyfunctional alcohols, such as trimethylolpropane, glycerol, pentaerythritol, ditrimethylolpropane, dipentaerythritol, ethoxylated, propoxylated or alkoxylated trimethylolpropane, glycerol, pentaerythritol, ditrimethylolpropane, dipentaerythritol or technical grade mixtures thereof.

Alcohols which can be obtained from the reaction of acids containing double bonds with monomeric epoxide compounds which optionally contain double bonds can moreover also be employed as monohydroxy-functional alcohols containing (meth)acrylate groups. Preferred reaction products are chosen from the group of (meth)acrylic acid with glycidyl (meth)acrylate or the glycidyl ester of a tertiary saturated monocarboxylic acid. Tertiary saturated monocarboxylic acids are, for example, 2,2-dimethylbutyric acid, ethylmethylbutyric, ethylmethylpentanoic, ethylmethylhexanoic, ethylmethylheptanoic and/or ethylmethyloctanoic acid.

Preferred monomers among those containing unsaturated groups and having a molecular weight of <700 g/mol are 2-hydroxyethyl(meth)acrylate, 2-hydroxypropyl(meth)acrylate, pentaerythritol triacrylate, dipentaerythritol pentaacrylate and the addition product of ethylmethylheptanoic acid glycidyl ester with (meth)acrylic acid and technical grade mixtures thereof.

The compounds listed under component A) can be used by themselves or also as mixtures.

Component B) comprises monomeric mono-, di- and/or triols in each case having a molecular weight of from 32 to 240 g/mol, such as e.g. methanol, ethanol, 1-propanol, 1-butanol, 1-pentanol, 1-hexanol, 2-propanol, 2-butanol, 2-ethylhexanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), diols derived from dimer fatty acids, 2,2-dimethyl-3-hydroxypropionic acid (2,2-dimethyl-3-hydroxypropyl ester), glycerol, trimethylolethane, trimethylolpropane, trimethylolbutane and/or castor oil. Neopentyl glycol, 1,4-butanediol, 1,4-cyclohexanedimethanol, 1,6-hexanediol and/or trimethylolpropane are preferred.

Component B) furthermore comprises oligomeric and/or polymeric hydroxy-functional compounds. These oligomeric and/or polymeric hydroxy-functional compounds are, for example, polyesters, polycarbonates, polyether carbonate polyols, C2-, C3- and/or C4-polyethers, polyether esters and polycarbonate polyesters having a functionality of from 1.0 to 3.0, in each case with a weight average molecular weight $M_W$ in the range of from 300 to 4,000, preferably 500 to 2,500 g/mol.

Hydroxy-functional polyester alcohols are those based on mono-, di- and tricarboxylic acids with monomeric di- and triols, such as have already been listed as component B), and polyester alcohol based on lactones. The carboxylic acids are, for example, phthalic acid, isophthalic acid, terephthalic acid, trimellitic acid, adipic acid, maleic acid, fumaric acid, tetrahydrophthalic acid, hexahydrophthalic acid, malonic acid, succinic acid, glutaric acid, pimelic acid, suberic acid, sebacic acid, dodecanedioic acid, hydrogenated dimers of fatty acids and saturated and unsaturated fatty acids, such as e.g. palmitic acid, stearic acid, myristoleic acid, palmitoleic acid, oleic acid, linoleic acid, linolenic acid, castor oil acid and technical grade mixtures thereof. Of the di- and tricarboxylic acids, the analogous anhydrides can also be used.

Hydroxy-functional polyether-ols are obtainable, for example, by polymerization of cyclic ethers or by reaction of alkylene oxides with a starter molecule.

Hydroxy-functional polycarbonates are hydroxyl-terminated polycarbonates, the polycarbonates accessible by reaction of diols, lactone-modified diols or bisphenols, e.g. bisphenol A, with phosgene or carbonic acid diesters, such as diphenyl carbonate or dimethyl carbonate. Hydroxy-functional polyether carbonate polyols are those such as are described for building up polyurethane dispersions in DE-A 102008000478.

Component C) comprises compounds with at least one group which is reactive towards isocyanate and additionally at least one group having a hydrophilizing action.

The groups having a hydrophilizing action include ionic groups C1) and/or the ionic groups C1) originating from potentially ionic groups C2) (for example by salt formation), which can be of anionic nature C1.1), such as, for example, sulfonium, phosphonium, carboxylate, sulfonate, phosphonate groups, or of cationic nature C1.2), such as, for example, ammonium groups, potentially ionic groups C2), i.e. groups which can be converted into ionic groups C1), for example by salt formation, and/or nonionic groups C3), such as, for example, polyether groups, which can be incorporated into the macromolecules by isocyanate-reactive groups. Isocyanate-reactive groups which are preferably suitable are hydroxyl and amino groups.

Compounds containing potentially ionic groups C2) include compounds with potentially anionic groups C2.1), such as, for example, mono- and dihydroxycarboxylic acids, mono- and diaminocarboxylic acids, mono- and dihydroxysulfonic acids, mono- and diaminosulfonic acids, mono- and dihydroxyphosphonic acids, mono- and diaminophosphonic acids and/or compounds with potentially cationic groups C2.2), such as, for example, ethanolamine, diethanolamine, triethanolamine, 2-propanolamine, dipropanolamine, tripropanolamine, N-methylethanolamine, N-methyl-diethanolamine and N,N-dimethylethanolamine.

Preferred compounds containing potentially anionic groups C2.1) are chosen from the group consisting of dimethylolpropionic acid, dimethylolbutyric acid, hydroxypivalic acid, N-(2-aminoethyl)-alanine, 2-(2-amino-ethylamino)-ethanesulfonic acid, ethylenediamine-propyl- or -butylsulfonic acid, 1,2- or 1,3-propylenediamine-ethylsulfonic acid, 3-(cyclohexylamino)propane-1-sulfonic acid, malic acid, citric acid, glycollic acid, lactic acid, glycine, alanine, taurine, lysine, 3,5-diaminobenzoic acid, an addition product of isophoronediamine (1-amino-3,3,5-trimethyl-5-aminomethylcyclohexane or IPDA) and acrylic acid (EP-A 916 647, Example 1); the adduct of sodium bisulfate on but-2-ene-1,4-diol polyether sulfonate and the propoxylated adduct of 2-butenediol and $NaHSO_3$, as described in DE-A 2 446 440 on page 5-9, formula I-III.

Particularly preferred compounds containing potentially ionic groups C2) are compounds containing carboxyl, sulfonic acid groups and/or tertiary amino groups, such as, for example, 2-(2-amino-ethylamino)-ethanesulfonic acid, 3-(cyclohexylamino)propane-1-sulfonic acid, the addition product of isophoronediamine and acrylic acid (EP 916 647 A1, Example 1), hydroxypivalic acid, dimethylolpropionic acid, triethanolamine, tripropanolamine, N-methyldiethanolamine and/or N,N-dimethylethanolamine.

Component C) very particularly preferably comprises hydroxypivalic acid and/or dimethylolpropionic acid as compounds with potentially ionic groups.

Suitable groups C3) having a non-ionically hydrophilizing action are, for example, polyalkylene oxide ethers which contain at least one hydroxyl or amino group and one or more alkylene oxide units, at least one of which is an ethylene oxide unit. These polyalkylene oxide ethers are accessible in a manner known per se by alkoxylation of suitable starter molecules.

Suitable starter molecules are, for example, saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, such as, for example, diethylene glycol monobutyl ether, unsaturated alcohols, such as allyl alcohol, 1,1-dimethylallyl alcohol or oleyl alcohol, aromatic alcohols, such as phenol, the isomeric cresols or methoxyphenols, araliphatic alcohols, such as benzyl alcohol, anisyl alcohol or cinnamyl alcohol, secondary monoamines, such as dimethylamine, diethylamine, dipropylamine, diisopropylamine, dibutylamine, bis-(2-ethylhexyl)-amine, N-methyl- and N-ethylcyclohexylamine or dicyclohexylamine, and heterocyclic secondary amines, such as morpholine, pyrrolidine, piperidine or 1H-pyrazole. Trimethylolpropane is likewise suitable, this being alkoxylated on only one OH group. Preferred starter molecules are saturated monoalcohols and trimethylolpropane which is alkoxylated on only one OH group. Diethylene glycol monobutyl ether is particularly preferably used as the starter molecule.

Alkylene oxides which are suitable for the alkoxylation reaction are, for example, ethylene oxide, 1-butene oxide and propylene oxide, which can be employed in the alkoxylation reaction in any desired sequence or also in a mixture.

The polyalkylene oxide polyether alcohols are either pure polyethylene oxide polyethers or mixed polyalkylene oxide polyethers, the alkylene oxide units of which include ethylene oxide units to the extent of at least 30 mol %, preferably to the extent of at least 40 mol %. Preferred nonionic compounds are monofunctional mixed polyalkylene oxide polyethers which contain at least 40 mol % of ethylene oxide units and not more than 60 mol % of propylene oxide units. Polyalkylene oxides which are started on trimethylolpropane and have an OH functionality of 2, such as e.g. Tegomer® D 3403 (Evonik Industries AG, Essen, DE) and Ymer® N 120 (Perstorp AG, Sweden) are likewise preferred.

The acids mentioned under component C2.1) are converted into the corresponding salts by reaction with neutralizing agents, such as triethylamine, ethyldiisopropylamine, dimethylcyclohexylamine, dimethylethanolamine, ammonia, N-ethylmorpholine, LiOH, NaOH and/or KOH. In this context, the degree of neutralization is preferably between 50 and 125%. The degree of neutralization is defined as follows: In the case of acid-functionalized polymers, as the quotient of base and acid; in the case of base-functionalized polymers, as the quotient of acid and base. If the neutralization is above 100%, in the case of acid-functionalized polymers more base is added than there are acid groups in the polymer; in the case of base-functionalized polymers, more acid is added than there are base groups in the polymer.

The bases mentioned under component C2.2) are converted into the corresponding salts by reaction with neutralizing agents, such as e.g. inorganic acids, such as, for example, hydrochloric acid, phosphoric acid and/or sulfuric acid, and/or organic acids, such as, for example, formic acid, acetic acid, lactic acid, methane-, ethane- and/or p-toluenesulfonic acid. In this context, the degree of neutralization is preferably between 50 and 125%.

The compounds listed under component C) can also be used in mixtures.

The ionic hydrophilization and the combination of ionic and nonionic hydrophilization are preferred over the purely nonionic hydrophilization.

Component D) comprises polyisocyanates chosen from the group of aromatic, araliphatic, aliphatic or cycloaliphatic polyisocyanates or mixtures of such polyisocyanates. Suitable polyisocyanates are, for example, 1,3-cyclohexane-diisocyanate, 1-methyl-2,4-diisocyanato-cyclohexane, 1-methyl-2,6-diisocyanato-cyclohexane, tetramethylene-diisocyanate, 4,4'-diisocyanatodiphenylmethane, 2,4'-diisocyanatodiphenylmethane, 2,4-diisocyanatotoluene, 2,6-diisocyanatotoluene, $\alpha,\alpha,\alpha',\alpha'$-tetramethyl-m- or -p-xylylene-diisocyanate, 1,6-hexamethylene-diisocyanate, 1-isocyanato-3,3,5-trimethyl-5-isocyanatomethylcyclohexane (isophorone-diisocyanate or IPDI), 4,4'-diisocyanato-dicyclohexylmethane, 4-isocyanatomethyl-1,8-octane-diisocyanate (triisocyanatononane, TIN) (EP-A 928 799), homologues or oligomers of these polyisocyanates listed with biuret, carbodiimide, isocyanurate, allophanate, iminooxadiazinedione and/or uretdione groups, and mixtures thereof. 1,6-Hexamethylene-diisocyanate, 1-isocyanato-3,3,5-trimethyl-5-isocyanatomethylcyclohexane (isophorone-diisocyanate or IPDI) and 4,4'-diisocyanato-dicyclohexylmethane, homologues or oligomers of 1-isocyanato-3,3,5-trimethyl-5-isocyanatomethylcyclohexane (isophorone-diisocyanate or IPDI) and 4,4'-diisocyanato-dicyclohexylmethane with biuret, carbodiimide, isocyanurate, allophanate, iminooxadiazinedione and/or uretdione groups and mixtures thereof are preferred.

Mono- and diamines and/or mono- or difunctional amino alcohols are used as component E) to increase the weight-average molecular weight $M_W$ of the polyurethane acrylates. Preferred diamines are those which are more reactive towards the isocyanate groups than water, since the lengthening of the polyester-urethane(meth)acrylates optionally takes place in an aqueous medium. The diamines are particularly preferably chosen from the group of ethylenediamine, 1,6-hexamethylenediamine, isophoronediamine, 1,3- and 1,4-phenylenediamine, piperazine, 4,4'-diphenylmethanediamine, amino-functional polyethylene oxides, amino-functional polypropylene oxides (known under the name Jeffamin® D series [Huntsman Corp. Europe, Zavantem, Belgium]) and hydrazine. Ethylenediamine is very particularly preferred.

Preferred monoamines are chosen from the group of butylamine, ethylamine and amines of the Jeffamin® M series (Huntsman Corp. Europe, Zavantem, Belgium), amino-functional polyethylene oxides, amino-functional polypropylene oxides and/or amino alcohols.

Catalysts F) which are employed for the urethanization for the preparation of the radiation-curable polyurethane dispersions according to the invention are bismuth(III) salts, such as e.g. bismuth(III) bromide, bismuth(III) chloride, bismuth(III) fluoride, bismuth(III) iodide, bismuth(III) nitrate, bismuth (III) oxide, bismuth(III) phosphate, bismuth(III) sulfide, bismuth(III) trifluoromethanesulfonate, bismuth(III) acetate, bismuth(III) neodecanoate, bismuth(III) salicylate, bismuth (III) 2,2,6,6-tetramethyl-3,5-heptanedionate, bismuth(III) 2-ethylhexanoate, bismuth(III) naphthanate (salt of naphthanoic acids: on average C6 to C7-cyclocarboxylic acids obtained from a naphtha fraction) and bismuth(III) citrate.

Bismuth(III) carboxylates are preferably employed, such as bismuth(III) acetate, bismuth(III) neodecanoate, bismuth (III) salicylate, bismuth(III) 2,2,6,6-tetramethyl-3,5-heptanedionate, bismuth(III) 2-ethylhexanoate, bismuth(III) naphthanate and bismuth(III) citrate. Bismuth(III) neodecanoate, bismuth(III) 2-ethylhexanoate and bismuth(III) citrate are particularly preferred.

Possible acids G) which are employed in combination with the bismuth(III) salts are organic and/or inorganic acids having a pKa of <2.5, preferably <2.0.

Suitable acids are, for example, hydrochloric, -bromic and -iodic acid, chlorous acid, chloric acid, perchloric acid, iodic acid, periodic acid, perchromic acid, nitric acid, phosphoric acid, phosphorous acid, hypophosphorous acid, diphosphoric acid, selenic acid, selenous acid, sulfurous acid, sulfuric acid, hydrogen sulfates, thiocyanic acid, phosphoric acid methyl, ethyl, n-propyl, n-butyl, dimethyl, di-(n-propyl), di-(n-butyl) and di-(2-ethylhexyl) ester, methanesulfonic acid, p-toluenesulfonic acid, 2,6-dihydroxybenzoic acid, amidosulfonic acid, nitroacetic acid, trimethylammoniumacetic acid, dichloro-, difluoro-, tribromo-, trichloro- and trifluoroacetic acid, malonic acid, maleic acid, bromomaleic acid, chloromaleic acid, chlorofumaric acid, bromofumaric acid, oxalic acid oxaluric cid, oxanilic acid, 4-nitrobenzoic acid, protonated amino acids having a pKa of <2.5 and saccharin.

Phosphoric acid di-(n-butyl) ester, methanesulfonic acid and p-toluenesulfonic acid are preferred.

It has been found, surprisingly, that the weight-average molecular weight $M_W$ of the polyurethane acrylate (i) can be controlled via the ratio of acid G) to bismuth salt F).

Bismuth(III) salts are employed in amounts of from 1 to 30,000 ppm, preferably 10 to 10,000 ppm, particularly preferably 50 to 1,000 ppm with respect to the solids content of the aqueous radiation-curable polyurethane dispersion (amount of the residue after evaporating off all the volatile constituents). The amount of acid employed in combination with the bismuth(III) salt is based on the amount of bismuth (III) salt employed and is between 10 to 300 mol %, preferably 15 to 150 mol %, particularly preferably 20 to 110 mol %.

Maximum weight-average molecular weights $M_W$ of the polyurethane acrylate (i) are achieved if 100 mol % of acid G) is used in relation to the bismuth(III) salt F).

The radiation-curable aqueous polyurethane acrylates (i) prepared by the process according to the invention have a weight-average molecular weight $M_W$ of from $10^3$ to $10^6$ g/mol, preferably $3*10^3$ to $9*10^5$ g/mol, particularly preferably $10^4$ to $7*10^5$ g/mol. The determination of the weight-average molecular weight $M_W$ of the polyurethane acrylate was carried out with the aid of gel permeation chromatography with polystyrene as the standard and N,N-dimethylacetamide as the mobile phase.

Component (ii) comprises reactive diluents, by which are to be understood compounds which contain at least one group which can undergo free radical polymerization, preferably acrylate and methacrylate groups, and preferably no groups which are reactive towards isocyanate or hydroxyl groups.

Preferred compounds (ii) contain 2 to 6, particularly preferably 4 to 6 (meth)acrylate groups.

Particularly preferred compounds (ii) have a boiling point of more than 200° C. under normal pressure.

Reactive diluents are described generally in P. K. T. Oldring (editor), Chemistry & Technology of UV & EB Formulations for Coatings, Inks & Paints, vol. II, chapter III: Reactive Diluents for UV & EB Curable Formulations, Wiley and SITA Technology, London 1997.

Reactive diluents are, for example, the alcohols methanol, ethanol, 1-propanol, 1-butanol, 1-pentanol, 1-hexanol, 2-propanol, 2-butanol, 2-ethylhexanol, dihydrodicyclopentadienol, tetrahydrofurfuryl alcohol, 3,3,5-trimethylhexanol, octanol, decanol, dodecanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), glycerol, trimethylolethane, trimethylolpropane, trimethylolbutane, pentaerythritol, ditrimethylolpropane, dipentaerythritol, sorbitol esterified completely with (meth)acrylic acid, and ethoxylated and/or propoxylated derivatives of the alcohols listed and the technical grade mixtures obtained during (meth)acrylation of the abovementioned compounds.

Component (ii) is preferably chosen from the group of (meth)acrylates of tetrols and hexols, such as (meth)acrylates of pentaerythritol, ditrimethylolpropane, dipentaerythritol, sorbitol, ethoxylated, propoxylated or alkoxylated pentaerythritol, ditrimethylolpropane, dipentaerythritol, sorbitol and ethoxylated and/or propoxylated derivatives of the alcohols listed and the technical grade mixtures obtained during (meth)acrylation of the abovementioned compounds.

All the processes known from the prior art can be used for the preparation of the dispersions according to the invention, such as emulsifier-shearing force, acetone, prepolymer mixing, melt emulsification, ketimine and solid spontaneous dispersing processes or derivatives thereof. A summary of these methods is found in Methoden der Organischen Chemie, Houben-Weyl, 4th edition, volume E20/part 2 on page 1682, Georg Thieme Verlag, Stuttgart, 1987. The melt emulsification and the acetone process are preferred. The acetone process is particularly preferred.

The invention also provides a process for the preparation of radiation-curable aqueous dispersions based on polyurethane acrylates (i), characterized in that a polyurethane acrylate (i) is obtained by reaction of components A) to C) with component D) in the presence of components F) and G) in one or more reaction steps, it being possible for a neutralizing agent to be added before, during or after the preparation of the addition product of A) to D) to produce the ionic groups necessary for the dispersing operation, followed by a dispersing step by addition of water to the addition product of A) to D) or transfer of the addition product of A) to D) into an aqueous reservoir, it being possible for chain lengthening by means of component E) to be carried out before, during or after the dispersing.

The invention also provides a process according to the above description, in which one or more reactive diluents (component (ii)) containing at least one group which can undergo free radical polymerization are admixed.

For the preparation of radiation-curable aqueous dispersions based on polyurethane acrylates (i), components A), B) and C) are initially introduced into the reactor and optionally diluted with acetone. Component (ii) can optionally also be added to components A) to C). Bismuth(III) salt F) and acid G) are added for catalysis of the addition on to the polyisocyanate D) and the mixture is heated to enable the reaction to start. Temperatures of from 30 to 60° C. are as a rule necessary for this. The polyisocyanate or polyisocyanates D) is or are then metered in. The reverse variant is also possible, the polyisocyanates D) then being initially introduced and the isocyanate-reactive components A), B) and C) being added. Components A), B) and C) can also be added successively and in any desired sequence. Stepwise reaction of the components is likewise possible, that is to say the separate reaction of component D) with one or more isocyanate-reactive components A), B) and/or C) before the adduct obtained is reacted further with the components which have not yet been used.

Instead of the combination of bismuth(III) salt and acid, the bismuth(III) salt and the acid can also be mixed beforehand and added as a mixture. It is likewise possible to purify or isolate the active metal species from this mixture and to use these as the catalyst.

To monitor the reaction, the isocyanate content is determined at regular intervals via titration or infra-red or near infra-red spectroscopy.

The molar ratios of isocyanate groups in D) to groups in A), B) and C) which are reactive towards isocyanate are from 0.8:1 to 2.5:1, preferably 1.2:1 to 1.5:1.

After the preparation of the polyurethane acrylate (i) by the process according to the invention from components A), B), C) and D) in the presence of F) and G), salt formation of the groups of component C) having a dispersing action takes place, if this has not yet been carried out in the starting molecules. In the case where component C) contains acid groups, bases chosen from the group of triethylamine, ethyldiisopropylamine, dimethylcyclohexylamine, dimethylethanolamine, ammonia, N-ethylmorpholine, LiOH, NaOH and/or KOH are preferably employed. In the case where component C) contains basic groups, acids chosen from the group of lactic acid, acetic acid, phosphoric acid, hydrochloric acid and/or sulfuric acid are preferably employed. If compounds containing only ether groups are employed as component C), this neutralization step is omitted.

Thereafter, a reactive diluent (ii) or a mixture of reactive diluents (ii) can optionally be added. Component (ii) is preferably admixed in at 30 to 45° C. As soon as this has dissolved, the last reaction step in which an increase in the molecular weight and the formation of the dispersions required for the coating system according to the invention take place optionally follows. The polyurethane acrylate (i) synthesized from components A), B), C) and D) in the presence of F) and G), and optionally the reactive diluent or diluents (ii) optionally dissolved in acetone, are either introduced into the dispersing water, which contains the amine or amines E), with vigorous stirring, or, conversely, the dispersing water/amine mixture is stirred into the polyurethane acrylate solution. The dispersions contained in the coating system according to the invention are moreover formed. The amount of amine E) employed depends on the unreacted isocyanate groups still present. The reaction of the still free isocyanate groups with the amine E) can take place to the extent of 35% to 150%. In the case where a deficiency of amine E) is employed, still free isocyanate groups react slowly with water. If an excess of amine E) is used, unreacted isocyanate groups are no longer present and an amine-functional polyurethane is obtained. Preferably, 80% to 110%, particularly preferably 90% to 100% of the still free isocyanate groups are reacted with the amine E).

In a further variant, it is possible for the increase in the molecular weight by the amine E) already to be carried out in acetone solution, i.e. before the dispersing, and optionally before or after the addition of the reactive diluent or diluents (ii).

In a further variant, it is possible to carry out the increase in molecular weight by the amine E) after the dispersing step.

If desired, the organic solvent—if present—can be distilled off. The dispersions then have a solids content of from 20 to 60 wt. %, in particular 30 to 58 wt. %.

It is likewise possible to carry out the dispersing and distillation step in parallel, that is to say simultaneously or at least partly simultaneously.

The invention also provides the use of the radiation-curable aqueous dispersions according to the invention for the production of coatings, in particular of lacquers and adhesives.

After removal of the water by conventional methods, such as heat, thermal radiation, moving optionally dried air and/or microwaves, the dispersions according to the invention give clear films. The films cure by subsequent crosslinking induced by radiation chemistry and/or free radicals to give lacquer coatings which are particularly high-quality and resistant to chemicals.

Electromagnetic radiation of which the energy, optionally with the addition of suitable photoinitiators, is sufficient to effect free radical polymerization of (meth)acrylate double bonds is suitable for polymerization induced by radiation chemistry.

The polymerization induced by radiation chemistry is preferably carried out by means of radiation with a wavelength of less than 400 nm, such as UV, electron, x- or gamma rays. UV radiation is particularly preferred, the curing with UV radiation being initiated in the presence of photoinitiators. A distinction is made in principle between two type of photoinitiators, the unimolecular (type I) and the bimolecular (type II). Suitable (type I) systems are aromatic ketone compounds, such as e.g. benzophenones in combination with tertiary amines, alkylbenzophenones, 4,4'-bis(dimethylamino)benzophenone (Michler's ketone), anthrone and halogenated benzophenones or mixtures of the types mentioned. (Type II) initiators, such as benzoin and its derivatives, benzil ketals, acylphosphine oxides, 2,4,6-trimethyl-benzoyl-diphenylphosphine oxide, bisacylphosphine oxides, phenylglyoxylic acid esters, camphorquinone, α-aminoalkylphenones, α,α-dialkoxyacetophenones and α-hydroxyalkylphenones, are furthermore suitable. Photoinitiators which can easily be incorporated into aqueous coating compositions are preferred. Such products are, for example, Irgacure® 500 (a mixture of benzophenone and (1-hydroxycyclohexyl) phenyl ketone, Ciba, Lampertheim, DE), Irgacure® 819 DW (phenyl-bis-(2,4,6-trimethylbenzoyl)-phosphine oxide, Ciba, Lampertheim, DE), Esacure® KIP EM (oligo-[2-hydroxy-2-methyl-1-[4-(1-methylvinyl)-phenyl]-propanone], Lamberti, Aldizzate, Italy). Mixtures of these compounds can also be employed.

Polar solvents, such as e.g. acetone and isopropanol, can also be employed for incorporation of the photoinitiators.

The UV curing is advantageously carried out at 30 to 70° C., because the degree of conversion of (meth)acrylate groups tends to be increased at a higher temperature. This can result in better resistance properties. Nevertheless, a possible heat-sensitivity of the substrate must be taken into consideration during UV curing, so that optimum curing conditions for a particular coating composition/substrate combination are to be determined by the person skilled in the art in simple preliminary experiments.

In this context, the radiation emitter or emitters which initiate the free radical polymerization can be fixed in position and the coated substrate is moved past the emitter by suitable conventional devices, or the radiation emitters can be moved by conventional devices, so that the coated substrates are fixed in position during the curing. It is also possible to carry out the irradiation e.g. in chambers, where the coated substrate is introduced into the chamber and the radiation is then switched on for a certain period of time, and after the irradiation the substrate is removed from the chamber again.

If appropriate, curing is carried out under an inert gas atmosphere, i.e. with exclusion of oxygen, in order to prevent inhibition of the free radical crosslinking by oxygen.

If the curing is carried out thermally by free radicals, water-soluble peroxides or aqueous emulsions of initiators which are not water-soluble are suitable. These agents which form free radicals can be combined with accelerators in a known manner.

The aqueous radiation-curable polyurethane dispersions according to the invention can be applied to the most diverse substrates by the conventional techniques, preferably spraying, rolling, flooding, printing, knife-coating, pouring, brushing and dipping.

In principle, all substrates can be lacquered or coated with the aqueous radiation-curable polyurethane dispersions according to the invention. Preferred substrates are chosen from the group consisting of mineral bases, wood, wood materials, furniture, parquet flooring, doors, window frames, metallic objects, plastics, paper, cardboard, cork, mineral substrates, textiles or leather. They are suitable here as a primer and/or as a top lacquer. In addition, the aqueous radiation-curable polyurethane dispersions according to the invention can also be employed in or as adhesives, e.g. in contact adhesives, in heat-activated adhesives or in laminating adhesives.

The aqueous radiation-curable polyurethane dispersions according to the invention can be employed by themselves and also in binder mixtures with other dispersions. These can be dispersions which likewise contain unsaturated groups, such as e.g. dispersions which contain unsaturated polymerizable groups and are based on polyester, polyurethane, polyepoxy(meth)acrylate, polyether, polyamide, polysiloxane, polycarbonate, epoxyacrylate, polyester acrylate, polyurethane polyacrylate and/or polyacrylate The coating systems according to the invention can also comprise those dispersions based on polyesters, polyurethanes, polyethers, polyamides, polyvinyl esters, polyvinyl ethers, polysiloxanes, polycarbonates and/or polyacrylates which contain functional groups, such as alkoxysilane groups, hydroxyl groups and/or isocyanate groups optionally present in blocked form. Dual cure systems which can be cured via two different mechanisms can thus be prepared.

So-called crosslinking agents can furthermore likewise be added to the coating system according to the invention for dual cure systems. Non-blocked and/or blocked polyisocyanates, polyaziridines, polycarbodiimides and melamine resins are preferably possible. Non-blocked and/or blocked hydrophilized polyisocyanates are particularly preferred for aqueous coating compositions. Preferably ≤20 wt. %, particularly preferably ≤10 wt. % of solid crosslinking agent, based on the solids content of the coating composition, is added.

The coating systems according to the invention can also comprise dispersions based on polyesters, polyurethanes, polyethers, polyamides, polysiloxanes, polyvinyl ethers, polybutadienes, polyisoprenes, chlorinated rubbers, polycarbonates, polyvinyl esters, polyvinyl chlorides, polyacrylates or a polyurethane polyacrylate, polyester acrylate, polyether acrylate, alkyd, polycarbonate, polyepoxy or epoxy(meth) acrylate basis which contain no functional groups. The degree of crosslinking density can thus be reduced, the physical drying can be influenced, e.g. accelerated, or an elastification or also an adjustment of the adhesion can be carried out.

Amino crosslinking resins, on a melamine or urea basis, and/or polyisocyanates with free or with blocked polyisocyanate groups, based on polyisocyanates, optionally containing hydrophilizing groups, from hexamethylene-diisocyanate, isophorone-diisocyanate and/or toluylidene-diisocyanate with urethane, uretdione, iminooxadiazinedione, isocyanurate, biuret and/or allophanate structure can also be added to the coating compositions which comprise the aqueous radiation-curable polyurethane acrylates according to the invention. Carbodiimides or polyaziridines are also possible as further crosslinking agents.

The binders, auxiliary substances and additives known in lacquer technology, such as e.g. pigments, dyestuffs or matting agents, can be added to or combined with the coating compositions according to the invention. These are flow and wetting additives, slip additives, pigments, including metallic effect pigments, fillers, nanoparticles, light stabilizer particles, anti-yellowing additives, thickeners and additives for reducing surface tension.

The coating compositions according to the invention are suitable for coatings on films, deformation of the coated film taking place between the physical drying and UV curing.

The coating compositions according to the invention are particularly suitable for clear lacquer uses on substrates of wood and plastic, where blocking resistance after physical drying and good resistances to chemicals after radiation curing are important.

The coating compositions according to the invention with a pigment content of ≥10 wt. %, based on the total formulation, are likewise particularly suitable for uses on wood and plastics. If an incomplete reaction of the radiation-curable groups in the coating system occurs during the radiation curing because the pigment contents are too high, non-blocking coatings are obtained.

The present invention likewise provides coating compositions comprising the radiation-curable aqueous dispersions according to the invention based on polyurethane acrylate, and crosslinking agents based on amino resins, blocked polyisocyanates, non-blocked polyisocyanates, polyaziridines and/or polycarbodiimides, and/or one or more further dispersions.

This invention also provides substrates coated with the coating compositions according to the invention.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Methods:

The determination of the weight-average molecular weight $M_W$ of the polyurethane acrylates by means of gel permeation chromatography was carried out on the following system:

| | |
|---|---|
| Pump | Hewlett Packard 1100 series II |
| Injector | Hewlett Packard 1100 series II |
| Column oven | VDS-Optilab Jetstream 2 Plus |
| Detector | Refractive index detector, Hewlett Packard 1100 series II |

-continued

| Columns | 1. PSS HEMA 40; 50 × 7.8 mm |
| --- | --- |
| | 2. PSS HEMA 1000; 300 × 7.8 mm |
| | 3. PSS HEMA 300; 300 × 7.8 mm |
| | 4. PSS HEMA 40; 300 × 7.8 mm |
| | 5. PSS HEMA 40; 300 × 7.8 mm |
| Mobile phase | N,N-Dimethylacetamide |
| Flow rate | 0.6 ml/min |
| Pressure | 100 bar |
| Temperature | 30° C. |
| Injection volume | 100 μl |
| Sample concentration | 13.4 g/l |
| Standard for the molecular weight | PSS Polymer-Standard-Service GmbH, Mainz, DE |
| Molecular samples [g/mol] | 162; 374; 1620; 9130; 18100; 32500; 67500; 128000; 246000; 659000; 1000000 |

The NCO content was in each case monitored titrimetrically in accordance with DIN 53185.

The solids content of the polyurethane dispersion was determined gravimetrically after all the non-volatile constituents had been evaporated off, in accordance with DIN 53216.

The average particle size was determined by laser correlation spectroscopy.

The flow time was determined in accordance with DIN 53211 with the aid of the 4 mm DIN cup.

To determine the storage stability of an aqueous radiation-curable polyurethane dispersion, a sample was stored at 40° C. for 7 days and then evaluated for sedimentation, coagulation or serum formation. The sample was storage-stable (OK) if no changes were to be detected visually after storage.

Catalysts for synthesis of the aqueous radiation-curable polyurethane dispersions:

Desmorapid Z: Dibutyltin dilaurate from Bayer MaterialScience AG, Leverkusen, DE Desmorapid SO: Tin(II) 2-ethylhexanoate from Bayer MaterialScience AG, Leverkusen, DE Borchikat 24: Bismuth(III) 2-ethylhexanoate from Borchers GmbH, Langenfeld, DE Borchikat 22: Zinc(II) 2-ethylhexanoate from Borchers GmbH, Langenfeld, DE VEXP 0519: Titanium(IV) catalyst for 2C use from Johnson Matthey, London, England VEXP 0588: Zirconium(IV) catalyst for 2C uses from Johnson Matthey, London, England VEXP 0584: Zirconium(IV) catalyst for 2C uses from Johnson Matthey, London, England Abbreviations used:

SC: solids content, APS: average particle size, FT: flow time, $M_W$: weight-average molecular weight, OK: OK, n.d.: not determined 1) DBTL-Catalysed Preparation of a Radiation-Curable Aqueous Polyurethane Dispersion (Comparison Example)

400.6 parts of the polyester acrylate Laromer® PE 44 F (BASF AG, Ludwigshafen, DE), component A), 5.4 parts of hexanediol, component B), 34.0 parts of dimethylolpropionic acid, component C), 77.2 parts of hexamethylene-diisocyanate, component D), 66.6 parts of 1-isocyanato-3,3,5-trimethyl-5-isocyanatomethylcyclohexane, component D), and 0.63 part (1.00 mmol) of Desmorapid Z (dibutyltin dilaurate from Bayer MaterialScience AG, Leverkusen, DE) were dissolved in 190 parts of acetone and reacted at 60° C., while stirring, up to an NCO content of 1.7 wt. % (theory 1.7 wt.%). Neutralization was then carried out by addition and stirring in of 20.2 parts of triethylamine. The clear solution was introduced into 950 parts of water, while stirring. Thereafter, a mixture of 8.4 parts of ethylenediamine, component E, and 24.0 parts of water was added to the dispersion, while stirring. The acetone was then distilled off from the dispersion under a slight vacuum. A UV-curable aqueous polyurethane dispersion 1) having a solids content (SC) of 39.8 wt. %, a flow time (FT) of 24 sec, an average particle size (APS) of 80 nm and a pH of 8.4 was obtained. The gel permeation chromatogram showed a weight-average molecular weight $M_W$ for the dispersed polyurethane acrylate of $2.00 \times 10^5$ g/mol.

The following Examples 2) to 18) were carried out analogously to Example 1), but with other catalysts and optionally with addition of acid.

| | Example | | | |
| --- | --- | --- | --- | --- |
| | 1) (comparison) | 2) (comparison) | 3) (comparison) | 4) (comparison) |
| Catalyst F) | 0.63 g (1.0 mmol) Desmorapid Z | 0.64 g (1.0 mmol) Borchikat 24 | 0.11 g (1.0 mmol) 1,4-diazabi-cyclo[2.2.2]octane | 0.10 g (1.0 mmol) triethylamine |
| Acid G) | — | — | — | — |
| SC | 39.8% | 38.7% | 38.3% | 39.7% |
| APS [nm] | 80 | 177 | 198 | 171 |
| pH | 8.4 | 8.2 | 8.0 | 8.5 |
| FT [sec] | 24 | 24 | 13 | 92 |
| $M_w$ [g/mol] | $2.00 \times 10^5$ | $3.61 \times 10^4$ | $1.3 \times 10^4$ | n.d. |
| Storage stability after 7 d at 40° C. | OK | sedimentation | sedimentation | n.d. |

| | Example | | | |
| --- | --- | --- | --- | --- |
| | 5) (comparison) | 6) (comparison) | 7) (comparison) | 8) (comparison) |
| Catalyst F) | 0.35 g (1.0 mmol) Borchikat 22 | 0.39 g (1 mmol) VEXP 0588 | 0.39 g (1 mmol) VEXP 0584 | 0.49 g (1 mmol) VEXP 0519 |
| Acid G) | — | — | — | — |
| SC | 41.7% | 39.9% | 39.4% | 38.7% |
| APS [nm] | 248 (sedimentation) | 57 | 60 | 122 |
| pH | 8.4 | 8.8 | 8.8 | 8.6 |
| FT [sec] | 19 | 155 | 107 | 87 |
| $M_w$ [g/mol] | $9.41 \times 10^3$ | n.d. | n.d. | $1.53 \times 10^4$ |
| Storage stability after 7 d at 40° C. | n.d. | n.d. | n.d. | OK |

Examples 2) to 8) show that alternative urethanization catalysts such as are known from 2C uses are not suitable for replacing DBTL in Example 1). This also includes bismuth (III) 2-ethylhexanoate, Example 2). Examples 2), 3), 5) and 8) all have a lower weight-average molecular weight $M_W$ compared with Example 1), and consequently a higher APS and, where appropriate, an inadequate storage stability at elevated temperature. Examples 4), 6) and 7) were quite highly viscous and not particularly finely divided and did not reach the quality of Example 1).

| | Example | | | |
|---|---|---|---|---|
| | 9) (according to the invention) | 10) (according to the invention) | 11) (according to the invention) | 12) (according to the invention) |
| Catalyst F) | 0.64 g (1.0 mmol) Borchikat 24 | 0.64 g (1.0 mmol) Borchikat 24 | 0.64 g (1.0 mmol) Borchikat 24 | 0.64 g (1.0 mmol) Borchikat 24 |
| Acid G) | 0.04 g (0.2 mmol) phosphoric acid di-(n-butyl) ester | 0.10 g (0.5 mmol) phosphoric acid di-(n-butyl) ester | 0.21 g (1.0 mmol) phosphoric acid di-(n-butyl) ester | 0.42 g (2.0 mmol) phosphoric acid di-(n-butyl) ester |
| SC | 39.3% | 39.1% | 37.7% | 37.8% |
| APS [nm] | 43 | 40 | 36 | 43 |
| pH | 8.0 | 8.4 | 8.9 | 8.6 |
| FT [sec] | 38 | 42 | 54 | 48 |
| $M_w$ [g/mol] | $1.73 * 10^5$ | $2.04 * 10^5$ | $4.88 * 10^5$ | $3.92 * 10^5$ |
| Storage stability after 7 d at 40° C. | OK | OK | OK | OK |

Examples 9) to 12) according to the invention show that the combination of bismuth(III) 2-ethylhexanoate and the strong acid phosphoric acid di-(n-butyl) ester arrives at results comparable to Example 1) with respect to APS, FT and $M_W$. Examples 9) to 12) according to the invention show that for a constant amount of bismuth salt and an increasing amount of acid, the weight-average molecular weight $M_W$ of the polyurethane acrylate and the fineness of the aqueous radiation-curable polyurethane dispersion increase, and reach their maximum at equimolar amounts of bismuth salt and acid. With an excess of acid compared with the bismuth salt, the weight-average molecular weight $M_W$ decreases again.

| | Example | | |
|---|---|---|---|
| | 13) (according to the invention) | 14) (according to the invention) | 15) (according to the invention) |
| Catalyst F) | 0.40 g (1.0 mmol) bismuth(III) citrate | 0.73 g (1.0 mmol) bismuth(III) neodecanoate | 0.64 g (1.0 mmol) Borchikat 24 |
| Acid G) | 0.04 g (0.2 mmol) phosphoric acid di-(n-butyl) ester | 0.04 g (0.2 mmol) phosphoric acid di-(n-butyl) ester | 0.02 g (0.2 mmol) methanesulfonic acid |
| SC | 38.4% | 37.1% | 39.4% |
| APS [nm] | 42 | 32 | 45 |
| pH | 8.8 | 8.8 | 8.6 |
| FT [sec] | 56 | 86 | 73 |
| $M_w$ [g/mol] | $2.40 * 10^5$ | $4.89 * 10^5$ | $4.37 * 10^5$ |
| Storage stability after 7 d at 40° C. | OK | OK | OK |

Examples 13) to 15) according to the invention show that other bismuth(III) salts and other strong acids also show the same effect as Example 9).

| | Example | | |
|---|---|---|---|
| | 16) (comparison) | 17) (comparison) | 18) (comparison) |
| Catalyst F) | 0.41 g (1.0 mmol) Desmorapid SO | 0.41 g (1.0 mmol) Desmorapid SO | 0.41 g (1.0 mmol) Desmorapid SO |
| Acid G) | — | 0.04 g (0.2 mmol) phosphoric acid di-(n-butyl) ester | 0.20 g (1.0 mmol) phosphoric acid di-(n-butyl) ester |
| SC | 40.1% | 40.5% | 41.1% |
| APS [nm] | 93 | 120 | 191 |
| pH | 8.6 | 8.8 | 8.8 |
| FT [sec] | 89 | 27 | 18 |
| $M_w$ [g/mol] | $1.81 * 10^5$ | $8.17 * 10^4$ | $4.31 * 10^4$ |
| Storage stability after 7 d at 40° C. | OK | OK | sedimentation |

Examples 16) to 18) show that the addition of a strong acid to tin(II) 2-ethylhexanoate does not have the same effect as in Examples 9) to 11). The results even show that as the amount of acid increases, the weight-average molecular weight $M_W$ decreases.

19) Preparation of a Polyester (Component B)

6,574 parts of isophthalic acid, 1,327 parts of trimethylolpropane, 7,207 parts of neopentyl glycol and 4 parts of Fascat® 4100 (butylstannonic acid, Arcema Inc., Philadelphia, Pa., USA) were heated up together to 190° C., while stirring. This temperature was maintained until an acid number of less than 1.5 mg of KOH/g of substance was reached. A polyester having an average functionality of 2.3 and a hydroxyl number of 365 mg of KOH/g of substance was obtained.

20) Preparation of a Radiation-Curable Aqueous Polyurethane Dispersion 1,595 parts of 2-hydroxyethyl acrylate, component A, were metered into a mixture of 2,236 parts of 4,4'-diisocyanatodicyclohexylmethane, component D, 2,244 parts of Desmodur® N 3300 (HDI trimer, Bayer AG, Leverkusen, DE), component D, and 0.75 part of dibutyltin dilaurate in 1,519 parts of acetone at 60° C. and the mixture was stirred further at 60° C. until an NCO content of 8.2 wt. % was reached. 1,373 parts of the polyester from Example 19), component B, dissolved in 421 parts of acetone, 305 parts of dimethylolpropionic acid, component C, and 0.75 part of DBTL (1.18 mmol) were then added at 40° C. and the mixture was heated up to 60° C., while stirring. When an NCO content of 0.6 wt. % was reached, the mixture was cooled to 40° C., and neutralization with 147 parts of triethylamine followed. The clear solution was introduced into 11,350 parts of water, while stirring. Thereafter, a mixture of 43.6 parts of ethylenediamine, component E, and 100 parts of water was added to the dispersion, while stirring. The acetone was then distilled off from the dispersion under a slight vacuum. A UV-curable aqueous polyurethane dispersion 20) having a solids content of 43 wt. %, an average particle size of 132 nm and a pH of 8.0 was obtained. The gel permeation chromatogram of the dispersion showed a weight-average molecular weight $M_W$ of $1.68*10^4$ g/mol.

21) Preparation of a Radiation-Curable Aqueous Polyurethane Dispersion According to the Invention The preparation proceeded in accordance with Example 20), but instead of DBTL 0.76 part of Borchikat 24 (1.18 mmol) and 0.25 part of phosphoric acid di-(n-butyl) ester (1.18 mmol) were used. A UV-curable aqueous polyurethane dispersion 21) having a solids content of 42 wt. %, an average particle size of 114 nm and a pH of 8.7 was obtained. The gel permeation chromatogram showed a weight-average molecular weight $M_W$ of $1.93*10^4$ g/mol.

22) Preparation of a Radiation-Curable Aqueous Polyurethane Dispersion 468 g of Desmodur® N 3300 (trimer with isocyanurate structural units based on hexamethylene-diisocyanate, Bayer MaterialScience, Germany), component D, 2.6 g of neopentyl glycol, component B, 34.8 g of dimethylolpropionic acid, component C, 0.40 g of DBTL (0.60 mmol) and 0.4 g of 2,6-di-tert-butyl-4-methylphenol (Inhibitor KB®) were dissolved in 300 g of acetone and the solution was homogenized. 204.2 g of hydroxyethyl acrylate, component A, were metered in at 55° C. such that the temperature did not rise above 65° C. When the theoretical NCO value of 0.3 wt. % was reached, a solution of 3.0 g of ethylenediamine, component E, in 32 g of acetone was added and the mixture was stirred for 30 minutes. After addition of 19 g of triethylamine, 980 g of distilled water were added for the dispersing and the acetone was distilled off under a slight vacuum. A UV-curable aqueous polyurethane dispersion 22) having a solids content of 37%, a pH of 7.9 and an average particle size of 97 nm was obtained. The gel permeation chromatogram showed a weight-average molecular weight $M_W$ of $3.43*10^3$ g/mol.

23) Preparation of a Radiation-Curable Aqueous Polyurethane Dispersion According to the Invention The preparation proceeded in accordance with Example 22), but instead of DBTL 0.40 part of Borchikat 24 (0.60 mmol) and 0.13 part of phosphoric acid di-(n-butyl) ester (0.60 mmol) were used. A UV-curable aqueous polyurethane dispersion 23) having a solids content of 39 wt. %, an average particle size of 103 nm and a pH of 8.2 was obtained. The gel permeation chromatogram showed a weight-average molecular weight $M_W$ of $3.31*103$ g/mol.

Examples 21) and 23) show that, compared with Examples 20) and 22), virtually the same aqueous radiation-curable polyurethane dispersions can be synthesized with the combination of bismuth(III) 2-ethylhexanoate and phosphoric acid di-(n-butyl) ester as under DBTL catalysis.

Formulations for Clear Lacquer Systems

|  | Clear lacquer [A-1, A-2] (parts by weight) |
|---|---|
| UV dispersion (adjusted to 40% solids) | 150 |
| Butyl glycol/water (1:1) | 12 |
| Irgacure ® 5001 | 1.5 |
| Wetting agent BYK ® 346[2] | 0.3 |
| Thickening agent BYK ® 425[3] | 0.4 |
| Total | 164.2 |

Application and Curing Conditions For Clear Lacquer Systems

|  | Clear lacquer [A-1] | Clear lacquer [A-2] |
|---|---|---|
| Substrate | wood | glass |
| Application by knife-coating | box knife, 1 × 150 μm, wet film | box knife, 1 × 150 μm, wet film |
| Deaeration time | 10 min, 50° C. | 10 min, 50° C. |
| Curing | 3.5 m/min[4] (Hg)[5] | 3.5 m/min[4] (Hg)[5] |

After the UV curing the coated substrates are stored (glass 1 h at room temperature in a desiccator) and then subjected to the tests.
[1]A mixture of benzophenone and (1-hydroxycyclohexyl) phenyl ketone from Ciba, Lampertheim, DE
[2]Solution of a polyether-modified polydimethylsiloxane from BYK, Wesel, DE
[3]Solution of a urea-modified polyurethane from BYK, Wesel, DE
[4]To test the reactivity, the hardness achieved after curing is measured in pendulum seconds (in accordance with DIN 53157) as a function of various belt speeds. If the pendulum hardness remains at values above 100 pendulum seconds even at the highest belt speed, the coating has an excellent reactivity.
[5]UV unit from Barberán, model HOK-6/2 (approx. 80 W/cm)

Data on the Use Testing of Clear Lacquer Systems

| Use testing | Example 1 (comparison) | Example 9 (acc. to the invention) | Example 10 (acc. to the invention) | Example 11 (acc. to the invention) |
|---|---|---|---|---|
| Film transparency[6], clear lacquer [A-2] | 4-5 | 5 | 5 | 5 |
| Storage stability: 50° C./24 h | OK | OK | OK | OK |
| Storage stability: 40° C./28 d | OK | OK | OK | OK |
| Water resistance[7], clear lacquer [A-1] | 5 | 5 | 5 | 5 |
| Coffee resistance[7], clear lacquer [A-1] | 5 | 5 | 5 | 5 |
| Ethanol/water (50%) resistance[7], clear lacquer [A-1] | 5 | 5 | 5 | 5 |
| Red wine resistance[7], clear lacquer [A-1] | 5 | 5 | 5 | 5 |
| Ethanol resistance (98%)[7], clear lacquer [A-1] | 4-5 | 4-5 | 4-5 | 4-5 |
| König pendulum hardness, clear lacquer [A-2] after ph. drying | 14 sec | 13 sec | 14 sec | 15 sec |
| König pendulum hardness, clear lacquer [A-2] after UV curing | 152 sec, 145 sec | 154 sec, 140 sec | 155 sec, 145 sec | 151 sec, 140 sec |
| Blushing after scratching[8], clear lacquer [A-2] | 5 | 5 | 5 | 5 |

[6]The film transparency is evaluated visually after drawing a film on to a glass plate and subsequent physical drying: Rating 5: clear, no clouding or hazing detectable Rating 4: a slight hazing is detectable at a viewing angle of approx. 10 to 20° Rating 3: a slight clouding is detectable at a viewing angle of approx. 45 to 80° Rating 2: significant clouding Rating 1: matt surface or granulated surface
[7]The resistance properties are evaluated by visual inspection after exposure for 16 hours: Rating 5: No visible changes (no damage) Rating 4: Slight change in shine or colour shade, only visible if the light source reflects in the test surface on or close to the marking and is reflected directly to the eye of the viewer, or some demarcated markings just detectable (swelling ring detectable, or no softening detectable with the fingernail). Rating 3: Slight marking to be seen from several viewing angles, for example an almost complete circle or circular area just detectable (swelling ring detectable, scratch tracks of the fingernail detectable) Rating 2: Severe marking, but the surface structure is largely unchanged. (closed swelling ring, scratch tracks detectable). Rating 1: Severe marking, but the surface structure is largely unchanged, marking can be scratched through to the substrate. Rating 0: Severe marking, the surface structure is changed or the surface material is completely or partly destroyed or the filter paper adheres to the surface.
[8]The blushing after scratching is tested by scratching by means of a coin. If no blushing at all is detectable at the scratching point, this result is evaluated as excellent (rating 5).

The testing of the use properties of the binders from Examples 9, 10 and 11 in the clear lacquer shows that equally good results are achieved in relation to the clear lacquer prepared from the DBTL-catalysed binder from Example 1.

The invention claimed is:

1. A tin-free, radiation-curable aqueous dispersion based on one or more polyurethane acrylates (i), wherein said one or more polyurethane acrylates (i) is prepared by reacting A) one or more compounds comprising at least one group which is reactive with isocyanate and at least one unsaturated group which can undergo free radical polymerization;
B) one or more compounds which differ from A) selected from the group consisting of monomeric monols, monomeric diols, monomeric triols, oligomeric hydroxy-functional compounds, and polymeric hydroxy-functional compounds, and which comprise at least one group which is reactive with isocyanate;
C) one or more compounds comprising at least one group which is reactive with isocyanate and at least one group having a hydrophilizing action; and
D) one or more organic polyisocyanates;
in the presence of a catalyst comprising
F) one or more bismuth(III) salts; and
G) an acid having a pKa of less than 2.5.

2. The tin-free, radiation-curable aqueous dispersion of claim 1, wherein said one or more polyurethane acrylates (i) is prepared from additional component E) by reacting A), B), C), D), and E) in the presence of F) and G), wherein E) differs from A), B), C), and D) and comprises at least one group which is reactive towards isocyanate.

3. The tin-free, radiation-curable aqueous dispersion of claim 1, wherein said tin-free, radiation-curable aqueous dispersion further comprises a reactive diluent with at least one group which can undergo free radical polymerization as component (ii).

4. The tin-free, radiation-curable aqueous dispersion of claim 1, wherein component F) comprises one or more bismuth(III) carboxylates.

5. The tin-free, radiation-curable aqueous dispersion of claim 1, wherein component F) is selected from the group consisting of bismuth(III) neodecanoate, bismuth(III) 2-ethylhexanoate, bismuth(III) citrate, and mixtures thereof.

6. The tin-free, radiation-curable aqueous dispersion of claim 1, wherein component G) is selected from the group consisting of phosphoric acid di-(n-butyl) ester, methanesulfonic acid, p-toluenesulfonic acid, and mixtures thereof.

7. The tin-free, radiation-curable aqueous dispersion of claim 1, wherein component F) is present in said tin-free, radiation-curable aqueous dispersion in an amount in the range of from 1 to 30,000 ppm, based on the solids content of the aqueous radiation-curable polyurethane dispersion (i), and component G) is present in said tin-free, radiation-curable aqueous dispersion in an amount in the range of from 10 to 300 mol %, based on the amount of component F) used.

8. The tin-free, radiation-curable aqueous dispersion of claim 1, wherein component G) is present in said tin-free, radiation-curable aqueous dispersion in an amount of 100 mol % based on the amount of component F) used.

9. The tin-free, radiation-curable aqueous dispersion of claim 1 wherein said one or more polyurethane acrylates (i) have a weight-average molecular weight $M_W$ in the range of from $10^3$ to $10^6$ g/mol.

10. The tin-free, radiation-curable aqueous dispersion of claim 1, wherein component A) is selected from the group consisting of hydroxy-functionalized polyester(meth)acrylates, polyether(meth)acrylates, polyether ester(meth)acrylates, epoxy(meth)acrylates, 2-hydroxyethyl(meth)acrylate, 2-hydroxypropyl(meth)acrylate, pentaerythritol triacrylate, dipentaerythritol pentaacrylate, and mixtures thereof.

11. The tin-free, radiation-curable aqueous dispersion of claim 1, wherein the molar ratio of the isocyanate groups of component D) to the isocyanate-reactive groups of components A), B) and C) is in the range of from 0.8:1 to 2.5:1.

12. A process for preparing the tin-free, radiation-curable aqueous dispersion of claim 1, comprising
(1) reacting components A), B), C), and D) in the presence of components F) and G) in one or more reaction steps to obtain a polyurethane acrylate (i, wherein a neutralizing agent is added before, during, or after the reaction of components A) B), C), and D) to produce the ionic groups necessary for dispersing the polyurethane acrylate obtained; and
(2) forming a dispersion by adding water to the polyurethane acrylate or transferring the polyurethane acrylate into an aqueous reservoir.

13. A coating composition prepared from the tin-free, radiation-curable aqueous dispersion of claim 1.

14. The coating composition of claim 13, wherein said coating is a lacquer or an adhesive.

15. The coating composition of claim 13, wherein said coating composition further comprises a crosslinking agent based on an amino resin, a blocked polyisocyanate, a non-blocked polyisocyanate, a hydrophilized polyisocyanate, a polyaziridine a polycarbodiimide, one or more further dispersions, or combinations thereof.

16. A substrate coated with the coating composition of claim 15.

17. The tin-free, radiation-curable aqueous dispersion of claim 1, wherein component B) is selected from the group consisting of methanol, ethanol, 1-propanol, 1-butanol, 1-pentanol, 1-hexanol, 2-propanol, 2-butanol, 2-ethylhexanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), diols derived from dimer fatty acids, 2,2-dimethyl-3-hydroxypropionic acid (2,2-dimethyl-3-hydroxypropyl ester), glycerol, trimethylolethane, trimethylolpropane, trimethylolbutane, and castor oil.

18. The tin-free, radiation-curable aqueous dispersion of claim 1, wherein component B) is selected from the group consisting of polyesters, polycarbonates, polyether carbonate polyols, C2-, C3-, C4-polyethers, polyether esters, and polycarbonate polyesters having a functionality of from 1.0 to 3.0, in each case with a weight average molecular weight $M_W$ in the range of from 300 to 4,000, preferably 500 to 2,500 g/mol.

* * * * *